April 11, 1961 H. P. WOLFF 2,979,703

PULSE COUNTER

Filed Sept. 17, 1959

| INPUT PULSE | | (RESET) | 1 | 2 | 3 | 4 | 5 | 6 | 7 | 8 | 9 | 10 |
|---|---|---|---|---|---|---|---|---|---|---|---|---|
| A | CORE 1 | 0 | 1-0 | 1-0 | 1-0 | 1-0 | 1-0 | 1-0 | 1-0 | 1-0 | 1-0 | 1-0 |
| | CORE 2 | 0 | 1 | 0 | 1 | 0 | 1 | 0 | 1 | 0 | 1 | 0 |
| | TX 1 | | | X | | X | | X | | X | | X |
| B | CORE 3 | 0 | 0 | 1- | 1 | 1 | 1 | 1 | 1 | 1 | 1 | 1-0 |
| | CORE 4 | 0 | 0 | 1+ | 1 | 1-0 | 0 | 1- | 1 | 1-0 | 0 | 1-0 |
| | CORE 5 | 1 | 1 | 1-0 | 0 | 1 | 1 | 1-0 | 0 | 1 | 1 | 1-0-1 |
| | DIODE 10 | | | | | | | X | | | | X |
| C | CORE 6 | 0 | 0 | 0 | 0 | 0 | 0 | 1-0 | 0 | 0 | 0 | 1-0 |
| | CORE 7 | 0 | 0 | 0 | 0 | 0 | 0 | 1 | 1 | 1 | 1 | 1-0 |
| | TX 2 | | | | | | | | | | | X |
| | CORE 8 | 0 | 0 | 0 | 0 | 0 | 0 | 0 | 0 | 0 | 0 | 1 OUTPUT |

INVENTOR
HERMANN P. WOLFF

BY *Mitchell & Bechert*

ATTORNEYS

United States Patent Office 2,979,703

Patented Apr. 11, 1961

2,979,703

PULSE COUNTER

Hermann P. Wolff, Poughkeepsie, N.Y., assignor to International Business Machines Corporation, New York, N.Y., a corporation of New York Filed Sept. 17, 1959, Ser. No. 840,752

8 Claims. (Cl. 340—174)

This invention relates to pulse counters and more particularly to such counters utilizing solid state circuit elements as the principal components thereof.

The subject invention involves a pulse counter utilizing bistable magnetic cores as data storage or memory elements. Such cores may be made of any suitable square hysteresis loop magnetic material. A plurality of counter stages utilizing such cores may be cascaded into a counter formation in which each stage responds to a number of applied pulses for forwarding a pulse to the next stage, with the last stage producing a counter output as a result of application of a cycle of pulses to the first stage.

An object of the invention is to provide an improved pulse counting arrangement of magnetic cores which may serve as a stage in a decimal or other capacity counter.

From one aspect, the invention provides a novel counting arrangement in which two bistable data storage elements, specifically magnetic cores, are so related that upon concurrent switching of the elements they develop mutually opposing outputs while the switching of one said element alone develops a useful output, the arrangement further including pulse responsive means for alternating the status of the one said element alone.

From another aspect, the invention provides a novel counting circuit arrangement involving a pair of data storage elements, specifically magnetic cores, alternated in status in response to a certain sequence of successive pulses to normally produce an output, the arrangement further including a bistable device operated in response to a particular pulse for suppressing the output.

Other objects of the invention will be pointed out in the following description and claims, and illustrated in the accompanying drawings which disclose, by way of example, the principle of the invention and the best mode, which has been contemplated, of applying that principle.

Figures 1, 2:
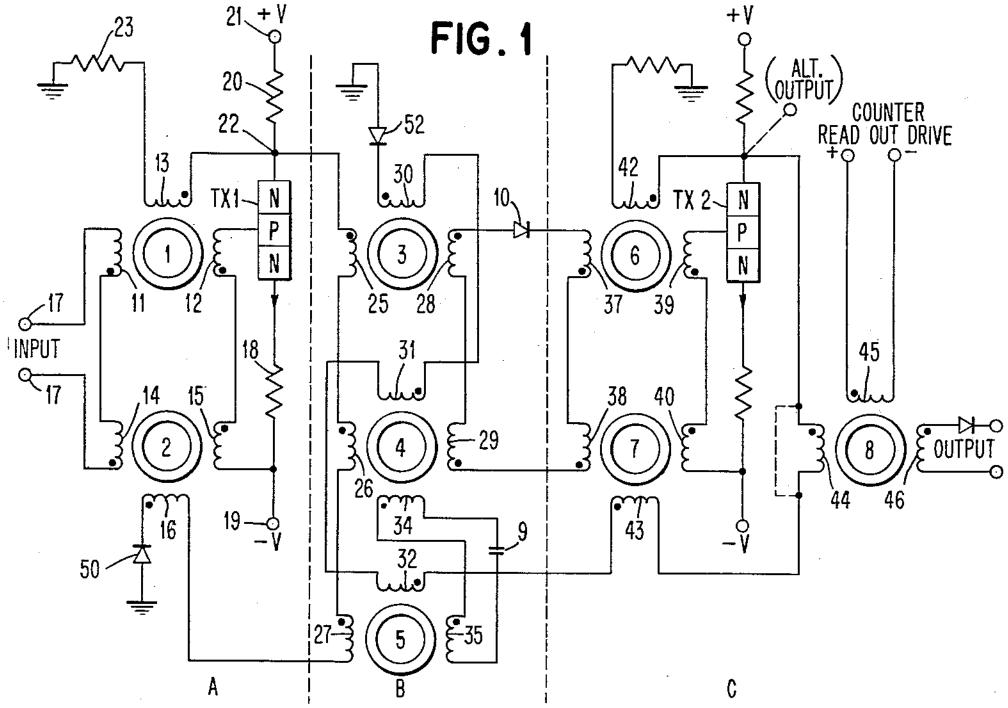
Fig. 1 is a schematic diagram of the counter embodying the invention.
Fig. 2 is a chart indicating the operation of the counter.

The invention is shown in Fig. 1 as applied to a decimal counter having input stage A, intermediate stage B and output stage C. Although, by way of example, the input and output stages have been shown specifically, it is to be understood that such stages could have been shown by block diagram. It is only necessary that the input stage be designed to operate at levels suitable for operating magnetic cores and the output stage respond to energy levels supplied by the magnetic core circuits.

As illustrated, each stage in itself is a pulse counting circuit relying on bistable magnetic cores as memory elements. The cores can be made of any suitable magnetic material exhibiting square hysteresis loop characteristics, such as a ferrite composition. Each core has one stable state of magnetic saturation in one direction which may be arbitrarily called its "0" state and an alternative state of magnetic saturation in opposite direction which may be called its "1" state. The core can be switched from one state to the other by applying a magnetic orientation reversing current to a winding inductively coupled to the core, such winding usually being wound through the core. In changing its state, the core induces a current in an associated winding, the direction of induced current depending on the direction of change in state of the core. In the illustrated embodiment, there are eight such magnetic cores, designated 1 to 8, the eighth core serving only as storage for the last bit of a plurality of successive bits.

The cores 1 and 2 in input stage A together with their windings and a transistor TX1 are arranged to serve as a binary pulse counting circuit forwarding one pulse for every two received pulses. A similar binary counter circuit is presented by output stage C in the arrangement of cores 6 and 7, their windings and a transistor TX2, supplemented by an output pulse storage core 8 and its windings. The arrangements in the input and output stages A and C may be regarded as essentially similar to arrangements included in Fig. 1 of copending application of A. S. Myers, Jr., Serial No. 794,078, filed February 18, 1959, and assigned to the assignee of the present application. On the other hand, intermediate stage B presents a novel counting circuit in its arrangement of cores 3, 4 and 5, their windings, a condenser 9 and a diode 10. Further, the novel circuit presented by the intermediate stage combines with the input and output stages to form an improved counter. The intermediate stage B will function to produce one output pulse for a sequence of more than two received pulses and thereafter will function to produce one output pulse for two received pulses in the manner of a binary counting circuit, until restored at the end of a counting cycle.

In more detail, except for core 4 which has four windings, the cores of the counter each have three windings called input, output and reset windings to indicate their functions. The dots at the windings indicate terminals of like polarity in conformity with standard transformer notation. In stage A, input winding 11, output winding 12 and reset winding 13 are associated with core 1. Core 2 has input winding 14, output winding 15 and reset winding 16. Input windings 11 and 14 are connected in series across pulse input terminals 17. As indicated by the placement of the dots, current resulting from application of an input pulse will flow in the same direction through input windings 11 and 14 and therefore tend to drive their respective cores 1 and 2 to the same magnetic state. The output windings 12 and 15 of the respective cores 1 and 2 are in series connection but as shown by the dots, current induced in one of these windings by a change in magnetic state of its core will be in opposite direction to current induced in the other of the windings by a like change in state of its core. Output windings 12 and 15 are therefore said to be in opposing or bucking relation. Output winding 12 connects at one end to the base of transistor TX1 which in the shown embodiment is of the NPN type. Alternatively, PNP transistors may be used requiring a change in biasing potentials. The emitter of TX1 connects via resistor 18 to negative voltage terminal 19, while the collector of TX1 is connected via resistor 20 to positive voltage terminal 21. With the connections as shown, the base-emitter junction of TX1 is normally back-biased to maintain TX1 Off. When TX1 is Off, the potential of the collector is positive relative to ground and current flows from point 22 in the collector line through the reset winding 13 of core 1 and resistor 23 to ground. The current flow is in a direction for influencing core 1 to its "0" state.

When transistor TX1 is turned On, in a manner later explained, the input stage A applies an input pulse to intermediate stage B. In accordance with the invention, the initial or reset state of core 5 in stage B is opposite to the reset state of each of cores 3 and 4. Alternatively, the initial core states may be the same and the winding on core 5 reversed. In either case it is only essential that core 5 be driven to a state opposite to that to which core 4 is driven. As illustrated however, the reset state of core 5 is its "1" state and the reset state of cores 3 and 4 is the "0" state. Input windings 25, 26 and 27 of cores 3, 4 and 5 are in series aiding relationship. Output winding 28 of core 3 is in bucking relation to output winding 29 of core 4. Reset windings 30, 31 and 32 also are associated with cores 3, 4, and 5. The cores 4 and 5 are provided, further, with windings 34 and 35 which are in bucking relation across condenser 9. Through the loop circuit containing the condenser and windings 34 and 35, a trigger relation is provided between cores 4 and 5. Assuming core 5 is in "1" state and core 4 in "0" state, an input pulse on their respective input windings 26 and 27 has no effect on core 5 but operates to switch core 4 to the "1" state. This produces current flow in the loop circuit containing condenser 9, the direction of current being such as to charge the condenser with its upper plate positive. After termination of the input pulse, the condenser discharge through the winding 35 of core 5 is effective to switch this core to its "0" state. The next input pulse will switch core 5 to its "1" state, and the resulting current through winding 35 is in a direction for charging condenser 9 with its lower plate positive. After pulse termination, the condenser discharge through winding 34 is in a direction for resetting core 4 to its "0" state. Thus, cores 4 and 5 are initially in opposite states and each time one of them is switched, it functions through a connecting circuit to reverse the state of the other core.

The output windings 28 and 29 of cores 3 and 4 are in opposing relation within a loop circuit containing diode 10 and input windings 37 and 38 of cores 6 and 7 in stage C. When core 4 is changed from the "0" to "1" state, it induces a voltage in winding 29 which, if unopposed, causes current to flow in forward direction through diode 10 and windings 37 and 38 of cores 6 and 7. However, if core 3 is switched to the "1" state concurrently with core 4, the voltages in windings 28 and 29 cancel each other and no current flows in the loop. Finally, upon reset of core 4 to the "0" state, it tends to cause inverse flow of current in the loop but current in that direction is blocked by the diode 10.

Regarding stage C, the cores 6 and 7 together with their input windings 37 and 38, their output windings 39 and 40, reset windings 42 and 43, and transistor TX2 are in a circuit arrangement similar to that of stage A. In addition, stage C may contain a final output unit including core 8 and its windings 44, 45 and 46. It is to be understood that core 8 is not necessarily a part of the decimal counter, since it is used only for storing the last of a cycle of pulses.

The invention will be further explained by following the counter operation through a cycle of 10 input pulses on terminals 17. As indicated in Fig. 2, initially all the cores are in "0" state except core 5 which is in the "1" state. The first pulse on terminals 17 is effective via input windings 11 and 14 to set cores 1 and 2 concurrently to their "1" state. Since the output windings 12 and 15 are in bucking relation, the voltages induced therein by simultaneous switching of cores 1 and 2 cancel each other and no change results in the "Off" status of transistor TX1. As the input pulse ends, core 1 begins to reset due to current flow through reset winding 13 from the positive terminal 21, and resetting action is completed in the interval between successive pulses. Thus the net effect of the first pulse to input stage A is to set core 2 to the "1" state.

The second pulse now finds only core 1 to be switched from "0" to "1" state. The resulting voltage across the windings 12 and 15 is of magnitude and polarity for turning on the transistor TX1. Regenerative feedback assists switching of core 1 to the "1" state. When TX1 turns On, the collector potential, previously positive, becomes negative. This causes a flow of current from ground through diode 50 in stage A, the reset winding 16 of core 2 and serially through input windings 25, 26 and 27 of cores 3, 4 and 5. The current through reset winding 16 resets core 2 to "0" state. The current through input windings 25, 26 and 27 is in a direction for driving cores 3, 4 and 5 of stage B to "1" state. Core 5 already being in "1" state is not affected but cores 3 and 4 are switched to "1" state. The outputs of cores 3 and 4 in windings 28 and 29 are of opposite polarity and cancel substantially; hence no current flows in the loop containing diode 10 and no output is forwarded from stage B to stage C at this time. When core 4 switched from "0" to "1" state, it produced current flow in the loop containing its winding 34 for charging condenser 9 with upper plate positive. After termination of the driving pulse, the condenser discharges through winding 35 in a direction to change core 5 from its "1" to "0" state. The discharge current of the condenser is also in a direction to maintain the exciting core in its newly acquired state. In stage A, core 1 resets as before, the setting and resetting of this core recurring for every input pulse.

In response to the first two input pulses, stage A has forwarded a driving pulse to stage B, causing change-over of cores 3 and 4 from their initial "0" state to the "1" state and change-over of core 5 from its initial "1" state to the "0" state.

The third input pulse sets core 2 to "1" state.

The fourth input pulse operates stage A to pass the second driving pulse to stage B. The latter pulse finds only core 5 in "0" state and switches this core to "1" state. Upon switching, core 5 energizes its winding 35 to charge condenser 9 with lower plate positive, so that after pulse termination the condenser discharge will be in a direction through winding 34 for causing reset of core 4 to "0" state. Core 3 remains set in "1" state to which it was driven by the first driving pulse on stage B.

The fifth input pulse to the counter sets core 2 to "1" state.

The sixth input pulse causes stage A to forward a third driving pulse to stage B. This time, only core 4 is found in "0" state and is switched by the driving pulse to the "1" state. Core 3 already being in the "1" state is not affected and so does not produce an output opposing the output of core 4 in its winding 29. Therefore, current flows through diode 10 and the input windings 37 and 38 of stage C in a direction to set cores 6 and 7 to the "1" state. Simultaneously, as core 4 switched, it caused condenser 9 to be charged with upper plate positive. After pulse termination, the condenser discharge through winding 35 changes core 5 from "1" to "0" state. The condition of stage B with respect to its cores 4 and 5 is opposite now to the previous condition. That is, the second driving pulse to stage B found stage B with core 4 in "1" state and core 5 in "0" state and left it with core 4 at "0" and core 5 at "1." The third pulse to stage B reversed the states of cores 4 and 5 and caused the stage to forward a pulse to stage C. This pulse on stage C has the net effect of setting its core 7 in "1" state, the core 6 being self resetting in the manner of core 1 in stage A.

The 7th and 8th input pulses to the counter produce a fourth driving pulse to stage B. This driving pulse finds only core 5 at "0" and switches it to "1," which in turn causes change of core 4 to "0" state.

In response to the 9th and 10th pulses to stage A, a fifth driving pulse is sent to stage B and switches core 4 to "1" state, causing stage B to forward the second pulse to stage C. Core 6 switches to the "1" state in response to the latter pulse and turns on transistor TX2. The collector of TX2 becomes negative with respect to ground and current flows from ground through a diode 52 and windings 30, 31, 32, 43 and 44. Current in windings 30 and 31 resets cores 3 and 4 to "0"; current in winding 32 resets core 5 to "1" state; and the current in winding 43 resets core 7. The current in winding 44 sets core 8 to "1" where the information is stored until application of a "read pulse" to produce a counter output pulse in the circuit including winding 46. When it is not required to store the information, core 8 is redundant. The signal can then be taken from the collector of TX2, as suggested by dashed lines in Fig. 1. If the ouput is derived from the collector TX2, the winding 44 would be shorted by closing switch S. After pulse termination, current flows from the collector of TX2 through winding 42 for resetting of core 6 to "0." Core 1 is also reset to "0" in the now familiar manner, and the decimal counter is back to its original status.

It is seen that the windings 13 and 42 perform dual functions of resetting and regenerative switching when the transistors are turned On.

An improved counter has been described. This counter features a stage B with an arrangement of three bistable magnetic cores 3, 4 and 5 of which cores 4 and 5 are in trigger relation. Initially the stage is set so that a first pulse would operate the trigger pair of cores 4 and 5 to produce an output pulse, but this output pulse is suppressed due to the bucking output of core 3 which is also switched by the first input pulse to the stage. From there on, core 3 has no further effect until the next counting cycle, and stage B functions as a binary trigger to produce one output pulse for every two applied pulses. Thus, stage B forwards one pulse to stage C in response to the first three pulses it receives from stage A, stage A producing these three pulses as a result of an input of six count pulses. In response to the next four pulses to be counted, stage A applies two more driving pulses to stage B, causing the latter stage to forward a pulse to stage C. Stage C having received two pulses from stage B, it functions to emit one counter output pulse.

While the circuit contained in stage B has preferred use in a decimal counter, it may also be used in other counters. Also, as understood, modifications in the device illustrated may be made within the scope of the invention as defined in the claims which follow.

What is claimed is:

1. A pulse counting arrangement comprising first and second cores capable of assuming two states of magnetic remanence, means responsive to input pulses for driving said cores from their first to their second states, output means coupled to each of said cores responsive to change of said cores from their first to their second states, said output means being connected in opposing relation, and means including a third core responsive to every second input pulse for subsequently switching the second core from its second to its first state.

2. A pulse counting arrangement comprising first and second bistable magnetic memory cores respectively provided with output means in series relation within an output circuit, means responsive to an applied pulse for concurrently switching said cores from their first states to their second states to develop opposing and mutually cancelling output voltages in their respective output means rendering the output circuit ineffective, and means including a third bistable magnetic memory core responsive to succeeding applied pulses for alternating the state of the second core alone to develop upon each return to its second state an unopposed output voltage in its output means rendering the output circuit effective.

3. The arrangement according to claim 2, further including in said output circuit means for blocking flow of current resulting from voltage developed in the output means of the second core upon each switching of this core to its first state.

4. The arrangement according to claim 2, wherein a circuit inductively couples the second and third cores in trigger relation such that either of the latter two cores upon switching to one state in response to an applied pulse energizes the circuit inductively coupling the cores for switching the other of these cores to a state responsive to the next applied pulse.

5. A pulse counting arrangement comprising a trigger pair of bistable magnetic cores in relatively opposite states, each core when in one stable magnetic state being switchable in response to an input pulse to its alternative stable magnetic state, a circuit inductively coupling the cores in opposing relation and through which either core upon switching to its alternative state in response to a pulse produces a switch of the other core to the pulse responsive state, an output circuit coupled to one said core to produce an output pulse upon switching of the latter core to one of its magnetic states, and a bistable device responsive to an input pulse concurrently with switching of the latter core for suppressing production of an output pulse by the output circuit.

6. The arrangement as defined in claim 5, said circuit inductively coupling the pair of magnetic cores including respective output windings for the cores and further including a capacitor across which the output windings are connected in opposing relation.

7. A pulse counting arrangement comprising a trigger pair of bistable magnetic cores in relatively opposite states, each core when in one state being switchable in response to an input pulse to alternative state, a circuit inductively coupling the cores in opposing relation and through which either core upon changing to its alternative state switches the other core to pulse responsive state, an output circuit coupled to a first of said cores and including an output winding in which said first core develops an output potential upon switching to its alternative state, and a third bistable magnetic core having an output winding in series opposing relation to the output winding of said first core, the third core being switchable in response to a given input pulse concurrently with switching of said first core by the latter pulse for developing a potential in its output winding canceling the potential developed in the output winding of the first core.

8. The arrangement of claim 7 combined with preceding and following binary pulse counting stages to provide a decimal counter, and a connection between the preceding stage and said arrangement through which the first pulse applied by the latter stage to the arrangement is effective to switch said first and third cores concurrently to output canceling states.

No references cited.